United States Patent
Gautam (10) Patent No.: US 9,197,647 B2
(45) Date of Patent: Nov. 24, 2015

(54) INTEGRITY CHECKING OF A CLIENT DEVICE IN A NETWORKED COMPUTER ENVIRONMENT

(71) Applicant: Cisco Technology, Inc., San Jose, CA (US)

(72) Inventor: Venkatesh Narsipur Gautam, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 107 days.

(21) Appl. No.: 14/058,437

(22) Filed: Oct. 21, 2013

(65) Prior Publication Data

US 2015/0113587 A1    Apr. 23, 2015

(51) Int. Cl.
*G06F 21/57* (2013.01)
*H04L 29/06* (2006.01)

(52) U.S. Cl.
CPC .............. *H04L 63/123* (2013.01); *G06F 21/57* (2013.01); *G06F 21/577* (2013.01)

(58) Field of Classification Search
None
See application file for complete search history.

(56) References Cited

U.S. PATENT DOCUMENTS

| 7,592,906 B1 * | 9/2009 | Hanna et al. ................... 340/506 |
| 7,996,713 B2 * | 8/2011 | Hanna ............................... 714/10 |
| 2004/0267590 A1 * | 12/2004 | Clark et al. ........................ 705/9 |
| 2005/0246537 A1 * | 11/2005 | Gunyakti et al. .............. 713/176 |
| 2006/0161970 A1 | 7/2006 | Hopen et al. |
| 2013/0305340 A1 * | 11/2013 | Wotring ........................... 726/11 |

OTHER PUBLICATIONS

Perrig, et al., Refutation of "On the Difficulty of Software-Based Attestation of Embedded Devices," based on the paper "On the Difficulty of Software-Based Attestation of Embedded Devices" In Proceedings of ACM Conference on Computer and Communications Security (CCS), Nov. 2009, http://sparrow.ece.cmu.edu/group/pub/perrig-vandoorn-refutation.pdf, 2010, 6 pages.

Loscocco, "Integrity Measurement, The Way Ahead, Knowing if your Systems Have Been Altered," NSA Trusted Systems Research, Briefing to ITSEF, Mar. 20, 2012, 26 pages.

Seshadri, et al., "SWATT: SoftWare-based ATTestation for Embedded Devices," IEEE Symposium on Security and Privacy, May 2004, pp. 272-282.

* cited by examiner

*Primary Examiner* — Minh Dinh
*Assistant Examiner* — Wayne An
(74) *Attorney, Agent, or Firm* — Edell, Shapiro & Finnan, LLC (57) ABSTRACT

Integrity checking a remote client includes generating integrity services configured to perform integrity checks on the client when executed thereon, and downloading a set of the generated services to the client. The integrity checking also includes receiving respective integrity check results from the downloaded services and performing respective integrity tests on each downloaded service based in part on the integrity check results received from that service. The integrity checking further includes replacing the set of downloaded services with a new set of services that perform same integrity tests as the replaced set of downloaded services if any downloaded service fails the respective integrity test performed thereon.

21 Claims, 5 Drawing Sheets

INTEGRITY SERVICE DATABASE ENTRY 400

| INTEGRITY SERVICE ID |
| --- |
| CURRENT SESSION ID |
| EXPECTED INTEGRITY SERVICE FUNCTIONALITY ID |
| TIME DEPLOYED |
| EXPIRATION TIME |
| HASH VALUE |

FIG.4

INTEGRITY CHECKING OF A CLIENT DEVICE IN A NETWORKED COMPUTER ENVIRONMENT

TECHNICAL FIELD

The present disclosure relates to integrity checking of client devices.

BACKGROUND

A headend server or "headend" may configure, control, and communicate with an endpoint device or "client" over a communication network. For example, the headend may download an application program and associated libraries to the client and then communicate with the application as a "trusted" application. However, the so called trusted application may be compromised in any number of ways undetected by the headend. For example, application processes executing on the client may be reverse-engineered and surreptitiously replaced with malicious processes. Rootkits may be installed on the client to hijack the application processes. Also, application libraries may be compromised using masquerading alternative libraries. Therefore, it is important that the headend verify an integrity and authenticity of the client and any applications thereon.

DESCRIPTION OF EXAMPLE EMBODIMENTS

Overview

Techniques are presented herein to integrity check a remote client device (or "client"). The technique includes generating uniquely identifiable integrity services configured to perform integrity checks on and return integrity check results from the client when executed thereon, and downloading a set of the generated services to the client. The technique also includes receiving respective integrity check results from the downloaded services as a result of the downloaded services executing on the client and performing respective integrity tests on each downloaded service based in part on the integrity check results received from that service. The technique further includes reporting results of the integrity tests performed on the downloaded services, and replacing the set of downloaded services with a new set of services that perform same integrity tests as the replaced set of downloaded services if any downloaded service fails the respective integrity test performed thereon.

Example Embodiments

Figure 1:
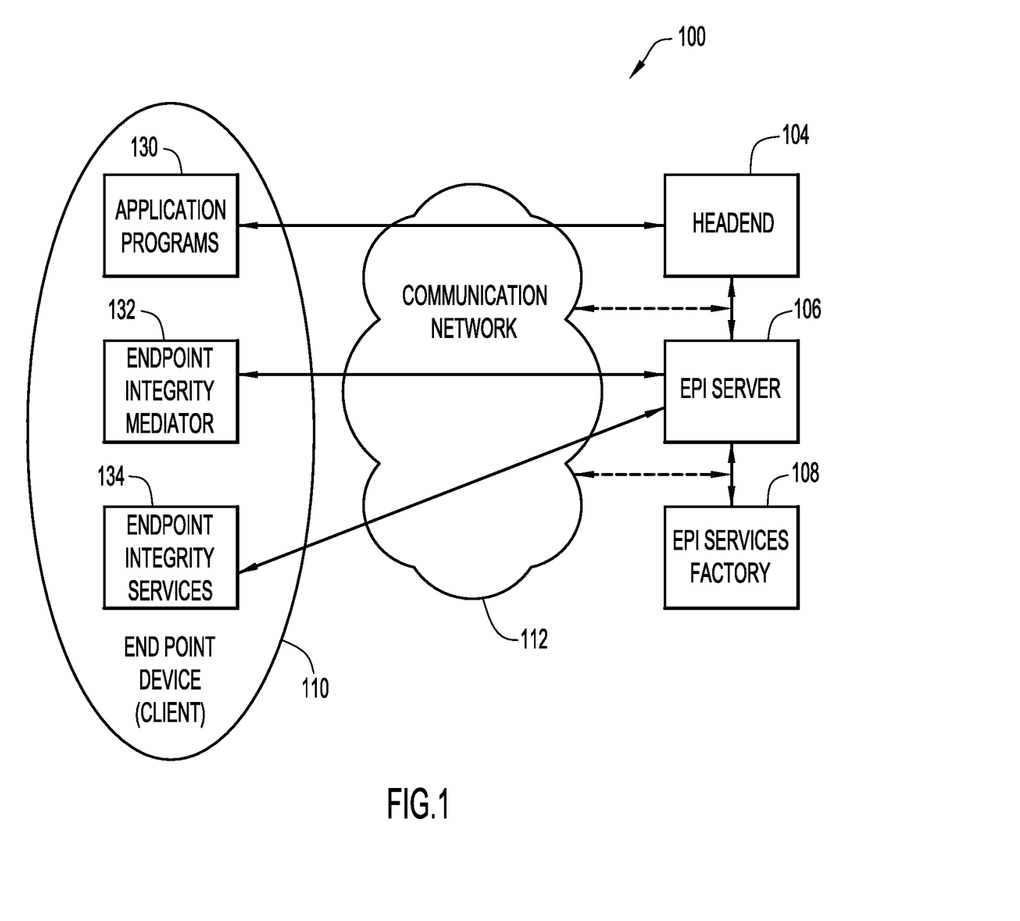
FIG. 1 is a block diagram of an example environment in which integrity checking of a remote device or client may be implemented in accordance with techniques provided herein.

Referring first to FIG. 1, there is shown a block diagram of an example environment 100 in which integrity checking of a remote device may be implemented in accordance with techniques provided herein. Environment 100 includes a headend server 104 (also referred to as a "headend"), an endpoint integrity (EPI) server 106, an EPI services factory 108, and a remote device or endpoint device 110 (also referred to as a "client") capable of communicating with each other over a communication network 112. Communication network 112 may include wide area networks (WANs), such as the Internet, and local area networks (LANs). Headend 104, EPI server 106, and EPI services factory 108 may each be implemented on a distinct computer system/server, or, alternatively, their respective functions may be combined and implemented on one or two servers. Also, headend 104, EPI server 106, and EPI services factory 108 may be on a same network or on different networks reachable one or more LANs and/or WANs. EPI server 106 and EPI services factory 108 may also comprise a distributed system of computing machines that perform tasks using a divide and conquer method such as map-reduce.

All communication between headend 104, EPI server 106, and EPI services factory 108, and client 110 may be secure, e.g., may use Transport Layer Security (TLS), Internet Protocol Security (IPsec), or any other secure means.

Headend 104, EPI server 106, and EPI services factory 108 cooperate with each other to collectively form an integrity checking system 120 for checking and verifying an integrity and a communication reliability of client 110. That is, integrity checking system 120 performs integrity checks on client 110 to ensure that the applications executing on the client and communication with the client have not been compromised and, therefore, can be trusted by headend 104. For example, the integrity checks provide a level of confidence that (i) the application processes and associated libraries executing on the client have not been reverse-engineered and replaced by malicious code, (ii) root kits have not hijacked the processes, and (iii) the application libraries have not been compromised.

At a high-level, integrity checking system 120 operates as follows. Headend 104 downloads computer programs to client 110. The downloaded computer programs include applications 130 and an EPI mediator 132. Headend 104 also downloads to EPI server 106 policies and information, such as integrity checks expected to be performed on client 110 and related expected integrity check results to be returned from the client as a result of the checks being performed thereon. EPI services factory 108 continuously generates integrity checking programs (referred to as "integrity services") that may be executed on client 110 to perform a variety of integrity checks on the client. EPI server 106 selects and downloads to client 110, via EPI mediator 132, a short-lived set of integrity services 134. EPI server 106 selects the integrity services based on the policies received from headend 104. Downloaded integrity services 134 execute on client 110 to perform the required integrity tests thereon, and return integrity check results to EPI server 106. EPI server 106 applies policies to and performs integrity tests on downloaded integrity services 134 based on the returned integrity check results and the policies from headend 104. EPI server 106 reports results of the integrity tests indicative of an integrity of client 110 to headend 104. The operations to select and download, receive results, and perform integrity tests on the returned results are repeated (i) periodically with a new set of integrity services each time the short lived integrity services expire, and (ii) if any of the integrity tests fail. Over time, this repeating integrity checking process verifies the integrity of client 110 to headend 104, if the integrity of the client can be so verified.

Figure 2:
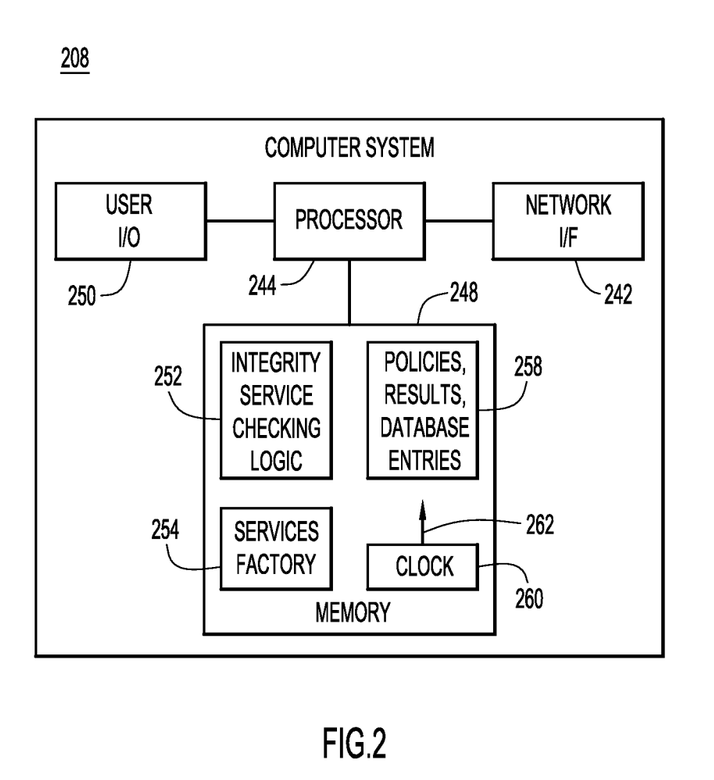
FIG. 2 is a block diagram of an example computer system configured to perform operations of an endpoint integrity (EPI) server and an EPI services factory from FIG. 1.

With reference to FIG. 2, there is shown an example block diagram of a computer system 208 configured to perform operations of EPI server 106 and EPI services factory 108, as described herein. There are numerous possible configurations for computer system 208 and FIG. 2 is meant to be an example. Computer system 208 includes a network interface unit 242, a processor 244, memory 248, and a user Input/Output module 250 used in association with the one or more graphical user interfaces (GUIs) to enable an administrator to interface with the computer system. The network interface (I/F) unit 242 is, for example, an Ethernet card device that allows computer system 208 to communicate over a network, e.g., a wired (Ethernet) network. Network I/F unit 242 may also include wireless connection capability. Processor 244 is a microcontroller or microprocessor, for example, configured to execute software instructions stored in the memory 248.

The memory 248 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 248 may comprise one or more computer readable storage media (e.g., a memory device) encoded with software comprising computer executable instructions and when the software is executed (by processor 244) it is operable to perform the operations described herein. For example, memory 248 stores or is encoded with instructions for Integrity Service Checking logic 252 to perform integrity service checking operations of EPI server 106 and Services Factory logic 254 to generate integrity services in EPI factory 108. Logic 252 and 254 may execute on separate servers (as depicted in FIG. 1) or on the same server, as depicted in FIG. 3. Also, Logic 252 and 254 may each be divided across distributed computing systems. In addition, the memory 248 includes a memory portion 258 to store information used by logic 252 and 254, including policies and information related to integrity checks to be performed on a remote client (e.g., client 110), integrity check results returned from integrity services executed on the remote client, and database entries directed to downloaded integrity services (e.g., services 134), described below.

Computer system 208 also includes a clock 260 to provide a steadily incrementing current time 262 used to determine if downloaded integrity services 134 have expired and, therefore, need to be replaced.

Figure 3A:
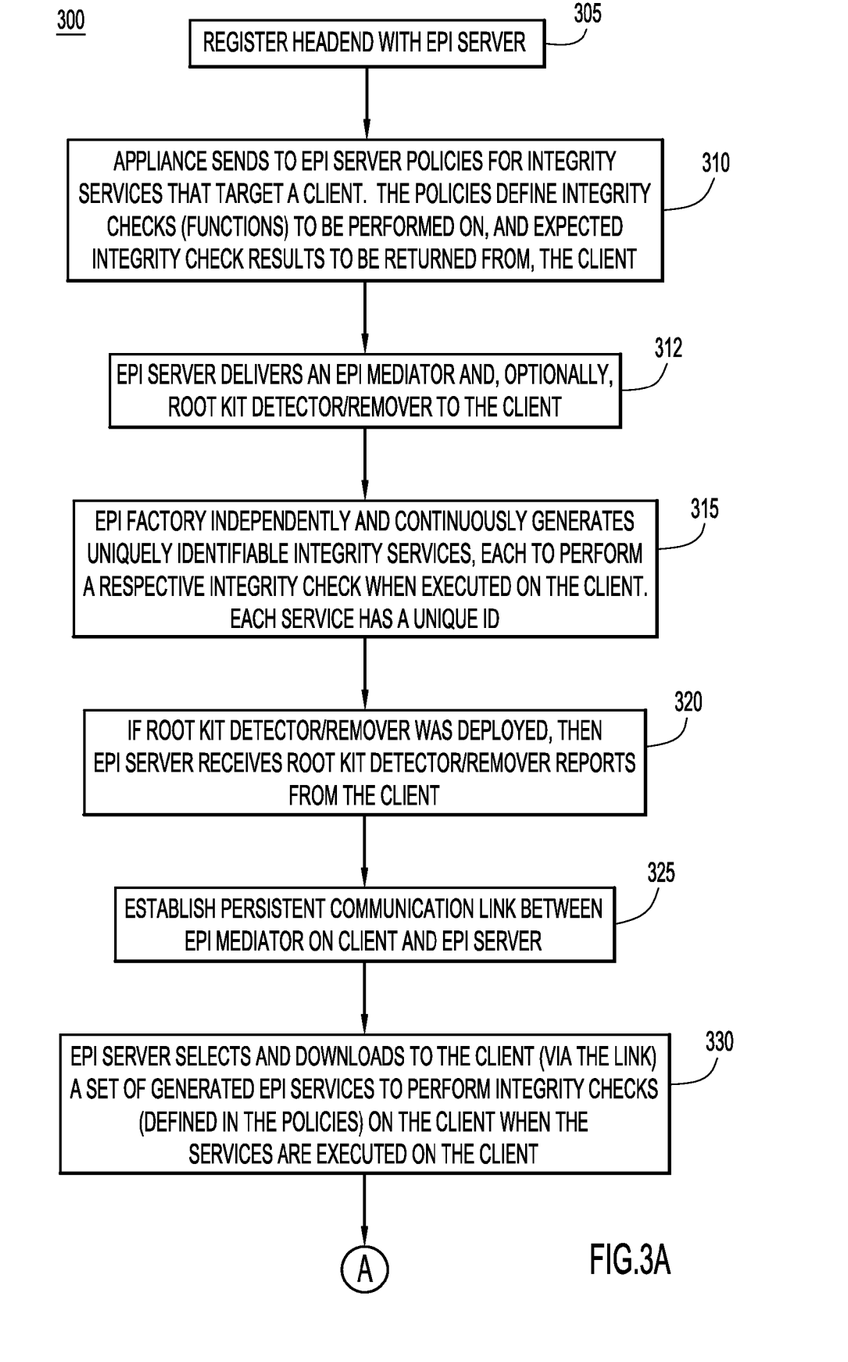
FIGS. 3A and 3B depict a flowchart of an example method performed by an integrity checking system in the environment of FIG. 1 to check an integrity of the remote client of FIG. 1.
Figure 3B:
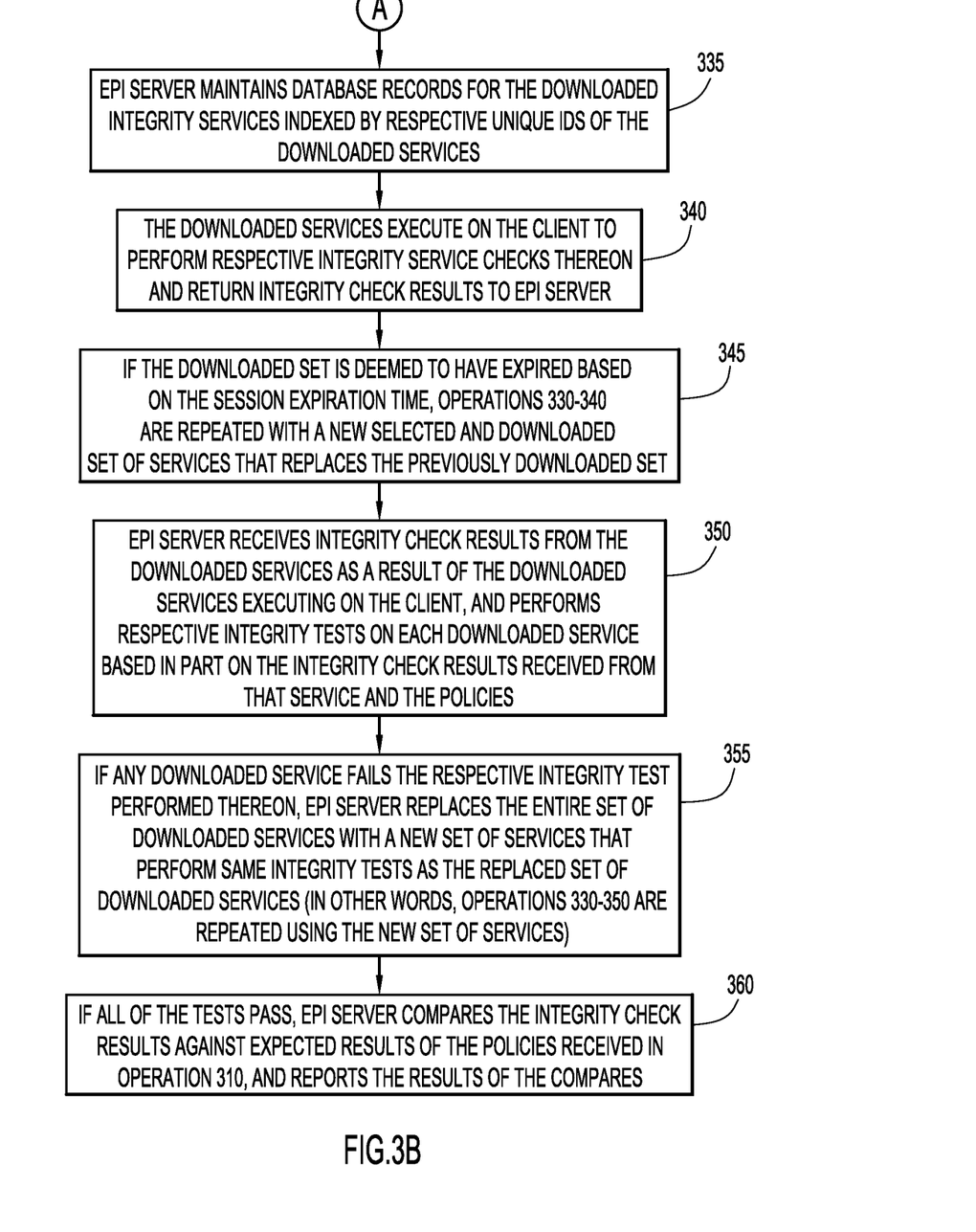

With reference to FIGS. 3A and 3B, there is a flowchart of an example method 300 performed by integrity checking system 120 to check an integrity of remote client 110. In the ensuing description, operations performed by "EPI server 106" are performed by logic 252 and operations performed by "EPI services factory 108" are performed by logic 254.

At operation 305, headend 104 registers with EPI server 106.

At operation 310, headend 104 establishes policies and information related to integrity checks to be performed on client 110 and downloads the policies and information to EPI server 106. The policies and related information include but are not limited to:

a. a list of software applications expected to be executing on client 110, including all libraries associated with the applications, and hash values of the applications and components in the libraries;

b. a requirement to detect and report anti-malware software and version numbers thereof on the client, and a last time stamp of a signature update on the client;

c. a requirement to detect and report an operating system (OS) and a version number thereof on the client;

d. a requirement to detect and report if a virtual machine (VM) is executing on the client or if the client is executing in a VM;

e. a requirement to report the following information related to the client: Internet Protocol (IP) address, Media Access Control (MAC) address, subnet, and International Mobile Station Equipment Identity (IMEI) number;

f. an amount of time (e.g., 10 seconds) that an integrity service (described below) is permitted to exist on the client and after which the integrity service is deemed expired; and g. expected results to be returned from integrity services configured to collect from the client the information listed in connection with (a)-(e) above. For example, expected results include a list of computed hash values for each of the application programs and the programs in their associated libraries that are executing on the client.

At 312, either headend 104 or EPI server 106 downloads to client 110 EPI mediator 132 and, optionally, a root kit detector and remover.

At 315, EPI services factory 108 continuously generates uniquely identifiable endpoint (client) integrity services (which are computer programs) configured to (i) perform respective integrity checks or functions on the client when downloaded to and executed on the client (in some cases the respective integrity check functions are distinct from each other, while in other cases the respective integrity check functions include overlapping functions), and (ii) return integrity check results from the client. Each integrity service includes or is associated with a unique integrity service identifier (ID) (e.g., a unique 128-bit identifier), and has a unique hash value, i.e., computing a hash of the integrity service (program) results in the unique hash value. The distinct integrity check or function performed by each integrity services is identified by an integrity service function ID.

Each integrity service is also configured to compute hash values of all other integrity services that execute on the client concurrently with that integrity service, and report the computed hash values as a set of computed hash values. For example, if ten integrity services execute on the client concurrently, each of the integrity services will compute hashes on the other nine integrity services and report the nine computed hash values as a set of nine computed hash values. For convenience, an "integrity service" is also referred to herein simply as a "service."

At 320, if a root kit detector was deployed at 312, the root kit detector executes and if it detects a root kit attack, attempts to remove the root kit from the client, and immediately reports the incident to EPI server 106.

At 325, downloaded EPI mediator 132 in client 110 establishes a persistent communication connection, e.g., a Transmission Control Protocol (TCP) connection, with EPI server 106.

At 330, EPI server 106 selects and downloads (via the TCP connection) a set of services (e.g., services 134), generated by EPI services factory 108, to client 110. EPI server 106 selects the set of services based on the policies and information received from headend 104, namely, those services that are configured to perform the integrity checks required by the policies. The downloaded services are considered to belong to, or be associated with, (i) an integrity session that is identified by a unique current integrity session ID, and (ii) a session expiration time after which the downloaded services in the session are considered expired. One or more of the selected/downloaded services is configured to compute hashes on each of the application programs and each of the programs in the associated libraries executing on client 110, and to return the computed hash values.

At 335, EPI server 106 updates an integrity services database with an entry for each downloaded service indexed by the unique (ID) of the service. Each integrity service database entry includes: the unique ID (e.g., a unique 128-bit ID), a current session ID associated with the currently downloaded set of services (e.g., services 134 depicted in FIG. 1), one or more expected integrity service functionality IDs (depending on how many functions the service is configured/expected to perform), a timestamp (i.e., time) when the service was deployed/downloaded, a timestamp of expiry (i.e., an expiration time) after which the service is considered expired, and a hash value for the service.

At 340, downloaded services 134 perform their respective integrity checks on the client and send their integrity check results to EPI server 106. The integrity check results from each service include the following information: a result of the integrity check performed by the service; the unique ID of the service; and the set of computed hash values for all of the other services concurrently executing on the client.

At 345, EPI server 106 determines if the set of services have expired based on a comparison of the session expiration time for that set against current time 262 from clock 260. If it is determined that the set of services has expired for the current session, then operations 330-340 are repeated with a new set of selected/downloaded services to replace the previously selected and downloaded set. Over time, operation 345 periodically (i.e., at corresponding periodic session expiration times) selects and downloads new sets of services. Assume an example in which operation 330 selects and downloads thirty (30) services for a current session, where a session has a ten (10) second expiration time. Then, every 10 seconds, a new set of 30 services will be selected and downloaded as long as the session expiration time is not preempted by a subsequent operation, such as operation 355 described below.

At 350, EPI server 106 receives the integrity check results sent from services 134 executed on client 110 in operation 340. EPI server 106 performs respective integrity tests on each service based in part on the integrity check results received from that service, the database entry for that service (made in operation 335), and the expected results listed in the policies and information received from headend 104 at operation 310. The integrity tests include, but are not limited to:
a. verifying the returned unique ID is as expected, i.e., is present in the database;
b. verifying the service has not expired based on a comparison of its expiration time in the database entry against current time 262 (FIG. 2);
c. verifying the set of computed hashes returned by the service matches the expected hash values for the other services in the set of services downloaded with the service in the current session; and
d. verifying the returned integrity check results match the functionality expected for the service as indicated by the one or more function IDs in the database entry.

At 355, if any of the tests (a)-(d) fail, then operations 330-350 are repeated with a new set of services (selected and downloaded in operation 330). Also, EPI server 106 may report any failed tests to headend 104.

At 360, if all of the tests (a)-(d) pass, then EPI server 106 subjects/compares the integrity check results against the expected results of the policies received in operation 310 (e.g., the reported OS version number is as expected, the returned computed hash values for each of the application programs and the programs in each of the associated libraries are as expected—see, e.g., operation 310(a) above, and so on). EPI server 106 reports the results of the comparison to headend 104.

Thus, in summary, method 300 performs integrity checks on client 110 to determine whether the client has been compromised and, therefore, whether headend 104 can trust the applications executing on and communications with the client.

Figure 4:
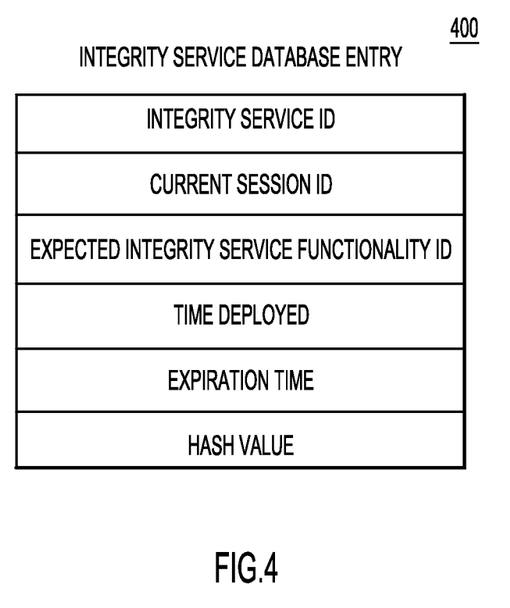
FIG. 4 is an illustration of an EPI server database entry for an integrity service downloaded to the client of FIG. 1.

Turning to FIG. 4, there is an illustration of an example integrity services database entry 400 made in operation 335 for a downloaded integrity service. Database entry 400 includes a unique integrity service ID, a current session ID, an expected integrity service functionality ID (this field may include multiple functionality IDs in a case where a service performs multiple functions), a timestamp of deployment (download) for the service, an individual expiration time for the service, and a hash value of the integrity service program.

In environment 100, headend 104 may communicate with multiple clients each similar to client 110. This communication may include client requests from a given one of the multiple clients to headend 104 and responses from the headend back to the given client. To use integrity check results reported by the given client effectively, there needs to be a way to correlate that client with its integrity check results, so that communications with different clients do not become confused. This correlation is used to verify an authenticity of the client, and includes an exchange of messages between headend 104, EPI server 106, and the client. Initially, when headend 104 receives a request from the given client, the headend submits a combination of the following parameters to EPI server 106:
a. EPI mediator unique number (mandatory);
b. last TCP sequence number sent by the headend to the client (mandatory);
c. Destination Internet Protocol (IP) address of the headend (mandatory);
d. Destination port of the headend (mandatory);
e. Client process/application name (mandatory);
f. source (client) IP Address if available (may not be in a network address translation set up (referred to as the "NATed" set up);
g. source (client) port if available (may not be in a NATed set up); and
h. source Media Access Control (MAC) address if available;

Headend 104 requests EPI server 106 to provide a current integrity status (if available) of the client communicating with the EPI server. If the source MAC address is available, then EPI server 106 may be able to instantaneously provide a response. If the provided source IP address is an IP address of a client that EPI server 106 knows its downloaded services (e.g., services 134) are executing on, it may be possible for the EPI server to provide an instantaneous response.

However if neither the source MAC address is available and the source IP address is not a recognized one, then the EPI address will need to be included in a multicast request to all clients running an instance of an EPI mediator for a sequence number received from the destination IP address and port, meant for the specific client process. EPI services would have to be downloaded to the client to perform this task. The EPI services would also have the ability to read sequence numbers. Meanwhile, headend 104 will need to continuously resend the sequence number it published to EPI server 106. This is done so that the just downloaded/installed EPI services may be able to catch the re-sent sequence number and hence match it to the correct client. Such mapping includes mapping the sequence number, destination address, and destination port to the expected client process name. The digital signature or hash of the client process and its dependent libraries, their file timestamps and versions, are then gathered by the EPI services and reported to EPI server 106. EPI server 106 then matches the received aforementioned information to its integrity services database entries and sends results of the matches to headend 104, which may decide to continue or abort the connection with the client based on the result.

Below is an example to illustrate the interactions described above.

Assume an Adaptive Security Appliance (ASA) executes on headend 104, and is controlled by an ASA administrator. Assume also the ASA chooses to use an integrity service mechanism (as described above) to check an integrity of clients. The ASA administrator first registers the ASA with EPI server 106 through a web-based GUI. The ASA establishes integrity service policies to check for the following on a client: Antivirus, Firewall, AntiSpyware, Device ID, IMEI ID, OS information, OS updates, rootkit, IP Address, and MAC Address. Input from the ASA administrator is required to specify the configuration of specific individualized processes, files, etc., downloaded by the headend to the client, which are not generic/default look-ups. That is, assume that the ASA administrator adds customized integrity checks to the policies for the specific individualized processes and files on the client. The ASA downloads a full set of policies to EPI server 106, including the default and customized policies. The ASA provisions an "AnyConnect" package that is part of the ASA, i.e., the AnyConnect package is provided to EPI server 106. The ASA also provision an EPI mediator to establish a connection between EPI server 106 and the client, and over which the EPI server downloads a set of integrity services selected based on the full set of policies. The downloaded services perform their respective integrity checks on the client and return integrity check results to EPI server 106. In the meantime, or at some point later when the AnyConnect package attempts a connection to headend 104, the ASA contacts EPI server 106 with the EPI mediator ID, the last TCP sequence number sent to the client, the client process name, the destination IP address and port and requests for the status of the client. EPI server 106 contacts the EPI mediator (through persistent TCP connection already set up by the EPI mediator) for the information. The above example can be extended to use with an Integrity Service Engine (ISE) in a similar way.

Techniques provided herein perform integrity checking of a remote client on behalf of a headend server that configures and communicates with the client. The integrity checking verifies whether applications executing on the remote client can be trusted. The integrity checking techniques are compromise-resistant because they include a high number of short-lived, periodically replaced integrity checking programs that are downloaded to and execute on client and that probe the client for a variety of integrity-related information, including hashes of the integrity services themselves that are currently executing on the client.

In summary, in one form, a method is provided, comprising: generating uniquely identifiable integrity services configured to perform integrity checks on and return integrity check results from a client when executed on the client; downloading a set of the generated services to the client; receiving respective integrity check results from the downloaded services as a result of the downloaded services executing on the client; performing respective integrity tests on each downloaded service based in part on the integrity check results received from that service; reporting results of the integrity tests performed on the downloaded services; and replacing the set of downloaded services with a new set of services that perform same integrity tests as the replaced set of downloaded services if any downloaded service fails the respective integrity test performed thereon.

In another form, an apparatus is provided, comprising: a network interface unit configured to send and receive communications over a network; and a processor coupled to the network interface unit, and configured to: generate uniquely identifiable integrity services configured to perform integrity checks on and return integrity check results from a client when executed on the client; download a set of the generated services to the client; receive respective integrity check results from the downloaded services as a result of the downloaded services executing on the client; perform respective integrity tests on each downloaded service based in part on the integrity check results received from that service; report results of the integrity tests performed on the downloaded services; and replace the set of downloaded services with a new set of services that perform same integrity tests as the replaced set of downloaded services if any downloaded service fails the respective integrity test performed thereon.

In still another form, a processor readable medium is provided for storing instructions that, when executed by a processor, cause the processor to: generate uniquely identifiable integrity services configured to perform integrity checks on and return integrity check results from a client when executed on the client; download a set of the generated services to the client; receive respective integrity check results from the downloaded services as a result of the downloaded services executing on the client; perform respective integrity tests on each downloaded service based in part on the integrity check results received from that service; report results of the integrity tests performed on the downloaded services; and replace the set of downloaded services with a new set of services that perform same integrity tests as the replaced set of downloaded services if any downloaded service fails the respective integrity test performed thereon.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
    generating uniquely identifiable integrity services configured to perform integrity checks on and return integrity check results from a client when executed on the client, wherein each integrity service hashes to a unique hash value and is configured to compute hash values of other services that execute on the client device concurrently with the respective integrity service and to return the computed hash values as a set of computed hash values in the integrity check results;
    downloading a set of the services to the client;
    receiving from each downloaded service respective integrity check results, the respective integrity check results including a set of computed hash values for all of the other downloaded services that execute concurrently on the client, as a result of the downloaded services executing on the client;
    performing respective integrity tests on each downloaded service based in part on the integrity check results received from that downloaded service, the performing including cross-referencing the respective set of computed hash values against hash values for the other downloaded services;

reporting results of the integrity tests performed on the downloaded services; and replacing the set of downloaded services with a new set of services that perform same integrity tests as the replaced set of downloaded services if any downloaded service fails the respective integrity test performed thereon, including if the cross-referencing fails.

2. The method of claim 1, further comprising periodically repeating the downloading, the receiving, the performing, the reporting, and the replacing.

3. The method of claim 1, further comprising associating each of the downloaded services with a respective expiration time after which the service is expired, wherein:
the performing respective integrity tests includes determining whether each downloaded service has expired based on the associated expiration time and a current time; and
the replacing includes replacing the set of downloaded services if it is determined that any downloaded service has expired.

4. The method of claim 1, further comprising:
receiving a service policy that defines integrity service functions to be performed on the client and corresponding expected results to be returned as a result of the performed functions, if any; and
selecting the set of services to be downloaded from among the generated services so that the selected set of services are configured to perform the integrity service functions defined in the service policy.

5. The method of claim 4, wherein the integrity service functions defined in the service policy include detecting:
anti-malware software executing on the client and associated software version numbers;
a most recent timestamp of any software signature update on the client;
an operating system executing on the client and an associated operating system version number; and
a virtual machine associated with the client.

6. The method of claim 4, wherein:
the performing respective integrity tests on each downloaded service includes determining, based on the integrity check results received for that service and the service policy, whether:
the integrity service function performed by the service was as expected; and
the integrity check results are as expected; and
the replacing includes replacing the set of downloaded services if it is determined that any integrity service function was not as expected or any integrity check result is not as expected.

7. The method of claim 1, further comprising:
storing a database entry for each downloaded service indexed by a unique identifier (ID) associated with the downloaded service, the database entry including a function (ID) corresponding to an expected integrity service function to be performed by the downloaded service, an expected result for an integrity check, an expiration time of the downloaded service, and a unique hash value for the downloaded service, wherein:
the receiving includes receiving the unique ID associated with each downloaded service as part of the integrity check results for that service; and
the performing respective integrity tests on each downloaded service includes indexing the database entry based on the received unique ID and performing the respective integrity tests based in part on the function ID, the expected result, and the expiration time.

8. The method of claim 1, further comprising:
associating the set of downloaded services with a set expiration time after which the set of downloaded services is expired,
wherein the replacing includes replacing the set of downloaded services when the set of downloaded services has expired.

9. An apparatus comprising:
a network interface unit configured to send and receive communications over a network; and
a processor coupled to the network interface unit, and configured to:
store a database entry for each of a plurality of downloaded services indexed by a unique identifier (ID) associated with the downloaded service, the database entry including a function (ID) corresponding to an expected integrity service function to be performed by the downloaded service, an expected result for an integrity check, an expiration time of the downloaded service, and a unique hash value for the downloaded service;
generate uniquely identifiable integrity services configured to perform integrity checks on and return integrity check results from a client when executed on the client;
download a set of the services to the client;
receive respective integrity check results, including the unique ID associated with each downloaded service, from the downloaded services as a result of the downloaded services executing on the client;
perform respective integrity tests on each downloaded service based in part on the integrity check results received from that service, by indexing the database entry based on the received unique ID and performing the respective integrity tests based in part on the function ID, the expected result, and the expiration time;
report results of the integrity tests performed on the set of downloaded services; and
replace the set of downloaded services with a new set of services that perform same integrity tests as the replaced set of downloaded services if any downloaded service fails the respective integrity test performed thereon.

10. The apparatus of claim 9, wherein the processor is further configured to associate each of the downloaded services with a respective expiration time after which the service is expired, and wherein the processor is configured to perform the respective integrity tests by determining whether each downloaded service has expired based on the associated expiration time and a current time; and the processor is configured to replace by replacing the set of downloaded services if it is determined that any downloaded service has expired.

11. The apparatus of claim 9, wherein the processor is configured to:
continuously generate the services such that each generated service hashes to a unique hash value;
compute hash values of other services that execute on the client device concurrently with the service;
return the computed hash values as a set of computed hash values in the integrity check results;
receive from each downloaded service the respective set of computed hash values for all of the other downloaded services that execute concurrently on the client;

perform respective integrity tests by cross-referencing the respective set of computed hash values against the hash values of the other downloaded services; and replace the set of downloaded services if the cross-referencing fails.

12. The apparatus of claim 9, wherein the processor is further configured to:

receive a service policy that defines integrity service functions to be performed on the client and corresponding expected results to be returned as a result of the performed functions, if any; and select the set of services to be downloaded from among the generated services so that the selected services in the set are configured to perform the integrity service functions defined in the service policy.

13. The apparatus of claim 12, wherein the processor is configured to:

perform respective integrity tests on each downloaded service by determining, based on the integrity check results received for that service and the service policy, whether the integrity service function performed by the service was as expected, and whether the integrity check results are as expected; and replace the set of downloaded services if it is determined that any integrity service function was not as expected or any integrity check result is not as expected.

14. The apparatus of claim 9, wherein the processor is further configured to:

associate the set of downloaded services with a set expiration time, after which the set of downloaded services is expired; and replace the set of downloaded services when the set of downloaded services has expired.

15. The apparatus of claim 9, wherein the processor is one of multiple distributed processors configured to perform the generate, the download, the receive, the perform, the report, and the replace operations in a distributed manner.

16. A non-transitory tangible processor readable medium storing instructions that, when executed by a processor, cause the processor to:

generate uniquely identifiable integrity services configured to perform integrity checks on and return integrity check results from a client when executed on the client, wherein each integrity service hashes to a unique hash value and is configured to compute hash values of other services that execute on the client device concurrently with the service and to return the computed hash values as a set of computed hash values in the integrity check results;

download a set of the services to the client;

receive from each downloaded service respective integrity check results, the respective integrity check results including a set of computed hash values for all of the other downloaded services that execute concurrently on the client, as a result of the downloaded services executing on the client;

perform respective integrity tests on each downloaded service based in part on the integrity check results received from that downloaded service, wherein the instructions to cause the processor to perform include instructions to cause the processor to cross-reference the respective set of computed hash values against hash values for the other downloaded services;

report results of the integrity tests performed on the downloaded services; and replace the set of downloaded services with a new set of services that perform same integrity tests as the replaced set of downloaded services if any downloaded service fails the respective integrity test performed thereon, including if the cross-referencing fails.

17. The processor readable medium of claim 16, further comprising instructions to cause the processor to:

associate each of the downloaded services with a respective expiration time after which the service is expired;

perform respective integrity tests including determining whether each downloaded service has expired based on the associated expiration time and a current time; and replace the set of downloaded services if it is determined that any downloaded service has expired.

18. The processor readable medium of claim 16, further comprising instructions to cause the processor to:

receive a service policy that defines integrity service functions to be performed on the client and corresponding expected results to be returned as a result of the performed functions, if any; and select the set of services to be downloaded from among the generated services so that the selected services in the set are configured to perform the integrity service functions defined in the service policy.

19. The processor readable medium of claim 18, wherein the instructions to cause the processor to:

perform respective integrity tests on each downloaded service to determine, based on the integrity check results received for that service and the service policy, whether the integrity service function performed by the service was as expected, and whether the integrity check results are as expected; and replace the set of downloaded services if it is determined that any integrity service function was not as expected or any integrity check result is not as expected.

20. The processor readable medium of claim 16, further comprising instructions to cause the processor to:

store a database entry for each downloaded service indexed by a unique identifier (ID) associated with the downloaded service, the database entry including a function (ID) corresponding to an expected integrity service function to be performed by the downloaded service, an expected result for an integrity check, an expiration time of the downloaded service, and a unique hash value for the downloaded service, wherein:

receive the unique ID associated with each downloaded service as part of the integrity check results for that service; and index the database entry based on the received unique ID and perform the respective integrity tests based in part on the function ID, the expected result, and the expiration time.

21. The processor readable medium of claim 16, further comprising instructions to cause the processor to:

associate the set of downloaded services with a set expiration time after which the set of downloaded services is expired; and replace the set of downloaded services when the set of downloaded services has expired.

* * * * *